United States Patent
Bartels et al.

(10) Patent No.: US 11,383,570 B2
(45) Date of Patent: Jul. 12, 2022

(54) SYSTEMS AND METHODS FOR A MATERIAL HANDLING VEHICLE WITH AN ARTICULATING AXLE

(71) Applicant: The Raymond Corporation, Greene, NY (US)

(72) Inventors: Alan W. Bartels, Wilton, IA (US); David King, Rock Island, IL (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 17/125,528

(22) Filed: Dec. 17, 2020

(65) Prior Publication Data

US 2021/0188030 A1 Jun. 24, 2021

Related U.S. Application Data

(60) Provisional application No. 62/952,795, filed on Dec. 23, 2019.

(51) Int. Cl.
*B60G 9/02* (2006.01)
(52) U.S. Cl.
CPC .......... *B60G 9/02* (2013.01); *B60G 2300/022* (2013.01)
(58) Field of Classification Search
CPC .. B60G 9/02; B60G 2300/022; B66F 9/07586
See application file for complete search history.

(56) References Cited

U.S. PATENT DOCUMENTS

| 3,276,532 | A | * | 10/1966 | Yonkers | ................... | B60G 9/02 |
| | | | | | | 180/54.1 |
| 3,292,943 | A | * | 12/1966 | Crockett | .................. | B60G 9/02 |
| | | | | | | 280/104 |
| 3,338,327 | A | * | 8/1967 | Bishop | ..................... | B60K 5/00 |
| | | | | | | 180/349 |
| 3,411,805 | A | | 11/1968 | Salna | | |
| 3,426,720 | A | * | 2/1969 | Enos | .................... | B62D 53/021 |
| | | | | | | 440/12.66 |
| 3,498,632 | A | * | 3/1970 | Bauers | ..................... | B60G 9/02 |
| | | | | | | 280/141 |
| 3,605,929 | A | * | 9/1971 | Rolland | ................. | B62D 61/08 |
| | | | | | | 180/208 |

(Continued)

FOREIGN PATENT DOCUMENTS

| EP | 1215164 A1 | 6/2002 |
| EP | 1253103 A2 | 10/2002 |

(Continued)

*Primary Examiner* — Paul N Dickson
*Assistant Examiner* — Kurtis Nielson
(74) *Attorney, Agent, or Firm* — Quarles & Brady LLP

(57) ABSTRACT

A material handling vehicle is provided. The material handling vehicle includes a vehicle frame having a drive wheel and an offset wheel arranged under the vehicle frame. The material handling vehicle further includes a rear load wheel assembly pivotally coupled to the vehicle frame via an articulating axle assembly. The rear load wheel assembly includes a first load wheel and a second load wheel. The pivotal coupling between the rear load wheel and the vehicle frame provided by the articulating axle assembly is configured to maintain the drive wheel and the offset wheel in contact with a floor on which the drive wheel and the offset wheel travel.

18 Claims, 3 Drawing Sheets

(56) References Cited

U.S. PATENT DOCUMENTS

| | | | | |
|---|---|---|---|---|
| 4,079,955 A | * | 3/1978 | Thorpe | B60G 9/02 280/474 |
| 4,082,377 A | * | 4/1978 | Saunders | B60G 7/005 301/124.1 |
| 4,714,263 A | * | 12/1987 | Marek | B60B 35/16 180/89.1 |
| 5,044,858 A | * | 9/1991 | Scott | B62D 53/021 414/10 |
| 5,447,321 A | * | 9/1995 | Hurlburt | B60G 9/02 180/266 |
| 5,921,338 A | * | 7/1999 | Edmondson | B60K 23/08 180/65.51 |
| 7,204,499 B2 | | 4/2007 | Miyake | |
| 7,793,742 B2 | * | 9/2010 | Donaldson | B62D 53/028 180/6.48 |
| 8,696,010 B2 | * | 4/2014 | Toebes | B62D 53/021 280/400 |
| 10,207,557 B2 | * | 2/2019 | Bjorn | B60L 53/14 |
| 2001/0013692 A1 | * | 8/2001 | Murase | B66F 9/07586 280/124.1 |
| 2001/0033067 A1 | * | 10/2001 | Vangsgard | B60G 9/02 280/400 |
| 2002/0093153 A1 | | 7/2002 | Scotese | |
| 2004/0113383 A1 | * | 6/2004 | Anderson | B66F 9/07586 280/124.111 |
| 2017/0129753 A1 | | 5/2017 | Kraimer | |
| 2019/0322511 A1 | * | 10/2019 | Penicaud | B66F 9/07568 |

FOREIGN PATENT DOCUMENTS

| | | | | |
|---|---|---|---|---|
| FR | 2651741 A1 | | 3/1991 | |
| GB | 476991 A | * | 12/1937 | B66F 9/07513 |
| GB | 476991 A | | 12/1937 | |
| GB | 850121 A | | 9/1960 | |
| GB | 1427194 A | | 3/1976 | |
| WO | WO-2008096793 A1 | * | 8/2008 | F16F 1/445 |
| WO | WO-2011128944 A1 | * | 10/2011 | A63C 17/0093 |
| WO | 2014081412 A1 | | 5/2014 | |
| WO | WO-2019175861 A1 | * | 9/2019 | B60G 9/02 |

* cited by examiner

SYSTEMS AND METHODS FOR A MATERIAL HANDLING VEHICLE WITH AN ARTICULATING AXLE

CROSS-REFERENCES TO RELATED APPLICATIONS

The present application is based on, claims priority to, and incorporates herein by reference in its entirety U.S. Provisional Patent Application No. 62/952,795, filed on Dec. 23, 2019, and entitled "Systems and Methods for a Material Handling Vehicle with an Articulating Axle."

STATEMENT REGARDING FEDERALLY SPONSORED RESEARCH

Not Applicable.

BACKGROUND

Generally, material handling vehicles are utilized to transport loads throughout an environment (e.g., a warehouse).

BRIEF SUMMARY

The present disclosure provides a material handling vehicle with an elevating operator platform and an articulating axle that is configured to pivot with respect to a vehicle drive frame to maintain one or more wheels under the vehicle drive frame in contact with a floor on which the material handling vehicle travels.

In one aspect, the present disclosure provides a material handling vehicle that includes a vehicle frame having a drive wheel and an offset wheel arranged under the vehicle frame. The material handling vehicle further include a rear load wheel assembly pivotally coupled to the vehicle frame via an articulating axle assembly. The rear load wheel assembly include a first load wheel and a second load wheel laterally opposite the first load wheel, and a coupling plate configured to receive a hitch thereon. The pivotal coupling between the rear load wheel and the vehicle frame provided by the articulating axle assembly is configured to maintain both the drive wheel and the offset wheel in contact with a floor on which the drive wheel and the offset wheel travel.

In one aspect, the present disclosure provides a material handling vehicle that includes a vehicle frame having a drive wheel and an operator compartment. The operator compartment is selectively movable vertically relative to a floor on which the drive wheel travels. The material handling vehicle further includes a rear load wheel assembly pivotally coupled to the vehicle frame via an articulating axle assembly. The rear load wheel assembly includes a first load wheel and a second load wheel. The first load wheel and the second load wheel are configured to pivot relative to the vehicle frame to maintain the drive wheel in contact with the floor.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
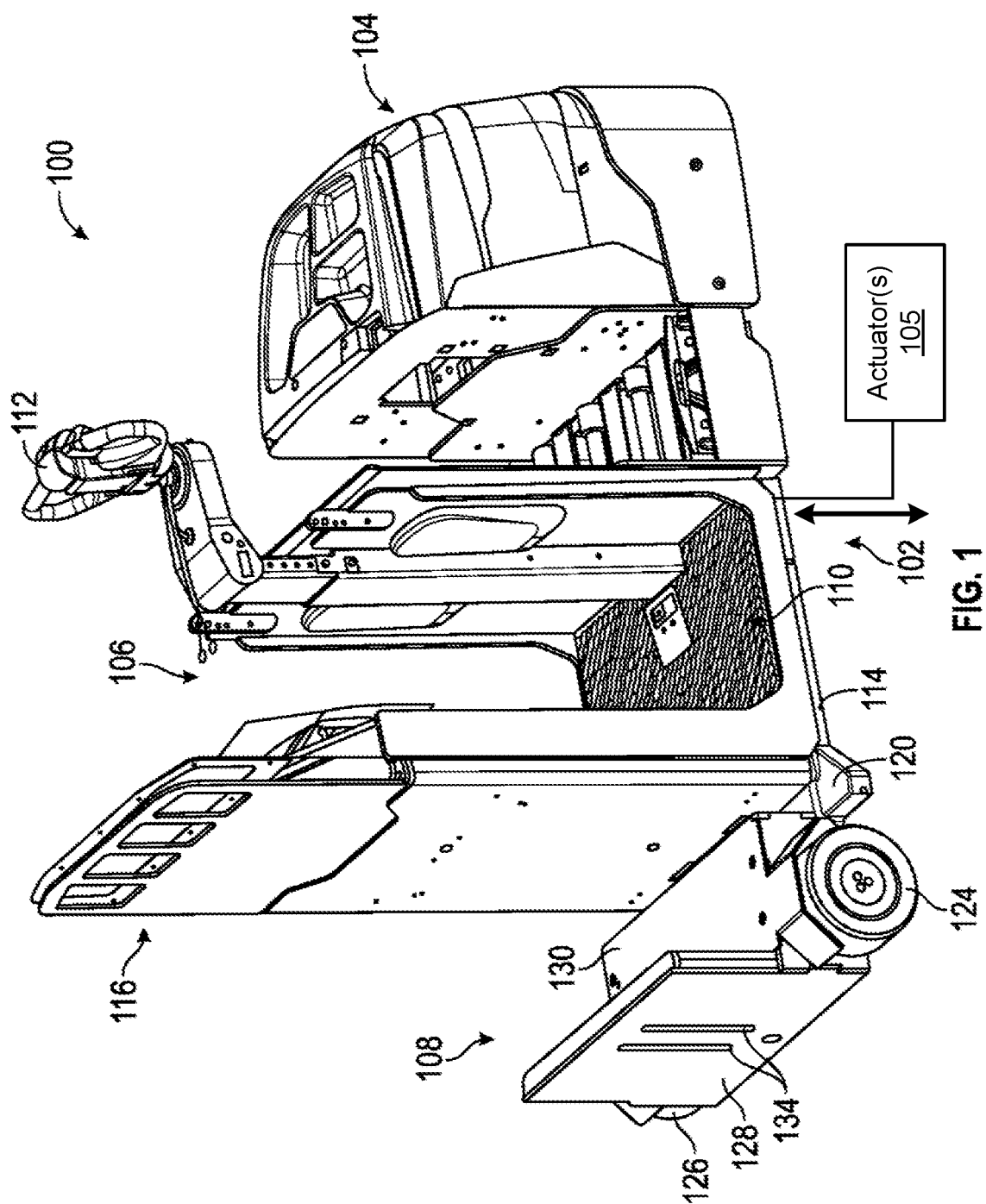
FIG. 1 is a top, back, right isometric view of a material handling vehicle according to the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

In some applications, picking and placing products in an environment (e.g., a warehouse) may require the use of an attachment that is towed behind a material handling vehicle ("MHV"). For example, a cart or wagon may be towed behind a material handling vehicle for an operator to pick products from and/or to place products into. In some instances, an operator may be required to pick a product from an elevated location (e.g., a racking structure above floor level), and the material handling vehicle may include an operator compartment that may be configured to raise and lower. In order to facilitate raising and lowering of the operator compartment, the wheels of the material handling vehicle arranged under the vehicle frame, on which the operator compartment is supported, may be required to be in contact with the floor on which the material handling vehicle travels.

Generally, the present disclosure provides a material handling vehicle with an elevating operator platform and an articulating axle that may be coupled to a rear load wheel assembly, which facilitates the attachment of a hitch to pull towed equipment (e.g., a cart or wagon). The articulating axle may pivot with respect to a vehicle drive frame. For example, the articulating axle may provide a rotational coupling between the vehicle frame and the rear load wheel assembly that allows the rear load wheel assembly to rotate relative to a floor on which the material handling vehicle travels. The rotational pivoting of the rear load wheel assembly provided by the articulating axle may maintain one or more wheels under the vehicle drive frame in contact with the floor, which provides stability to an operator platform supported by the vehicle frame and enables the operator compartment to be raised and lowered while the material handling vehicle is traveling.

FIG. 1 illustrates one non-limiting example of a material handling vehicle 100 according to the present disclosure. In the illustrated non-limiting example, the material handling vehicle may be in the form of a tow tractor that may include a vehicle frame 102, a power section 104, an operator compartment 106, and a rear load wheel assembly 108. The vehicle frame 102 may support the power section 104 and the operator compartment 106 thereon. The power section 104 may include, for example, a motor, a transmission, and a battery, among other components.

The operator compartment 106 may include a platform 110 on which an operator may stand and vehicle controls 112. The operator compartment 106 may be selectively movable vertically relative to a floor on which the material handling vehicle travels. For example, one or more actuators 105 (e.g., hydraulic or electric) may be coupled to the operator compartment 106 to selectively displace the operator compartment 106 relative to the floor. In the illustrated non-limiting example, the vehicle controls 112 may be in the form of a control handle that an operator may manipulate to control a speed of the material handling vehicle 100, a travel direction of the material handling vehicle 100, and/or a height of the operator compartment 106.

Figure 2:
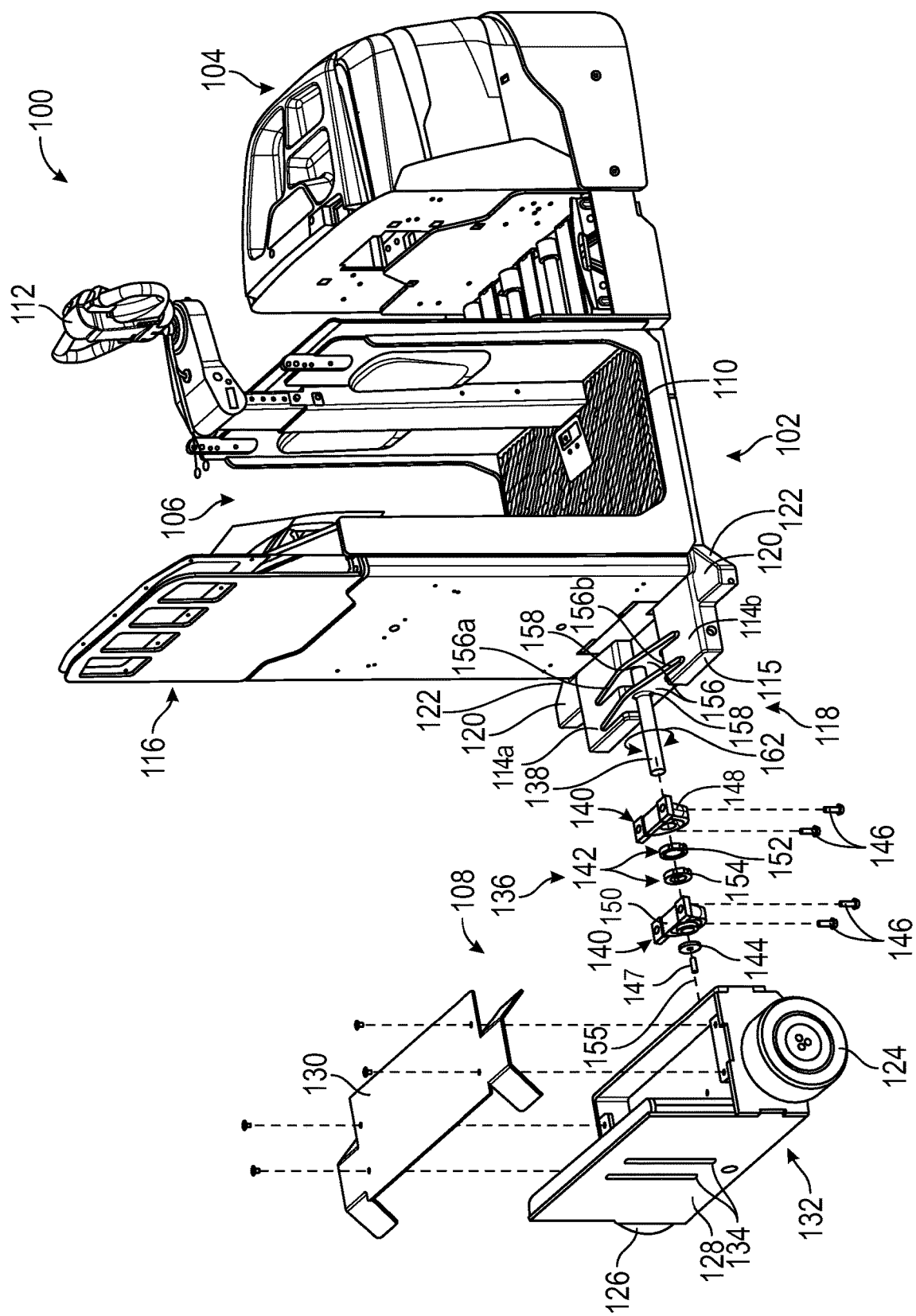
FIG. 2 is a partially exploded top, back, right isometric view of the material handling vehicle of FIG. 1.
Figure 3:
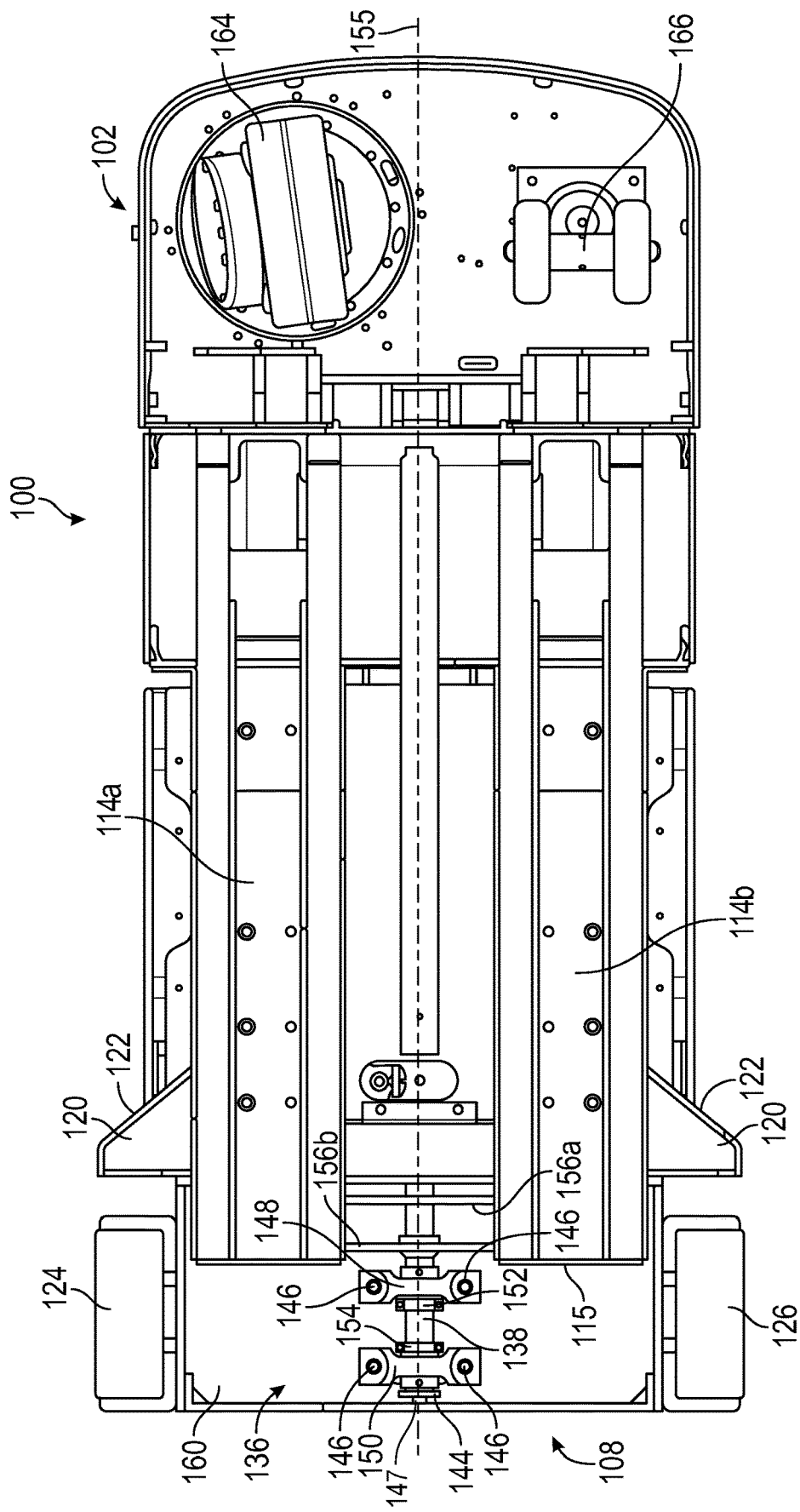
FIG. 3 is a bottom plan view of the material handling vehicle of FIG. 1.

With reference to FIGS. 1-3, in the illustrated non-limiting example, the vehicle frame 102 includes a pair of support beams 114 that extend longitudinally along the material handling vehicle 100. The pair of support beams 114 protrude beyond a backrest 116 of the operator compartment 106 at a back end 118 of the vehicle frame 102 (e.g., an end located away from the power section 104). A pair of side bumpers 120 extend laterally outwardly from an outer side of the support beams 114 adjacent to the back end 118 of the vehicle frame 102. In the illustrated non-limiting example, the side bumpers 120 each define a generally triangular shape and include an angled front surface 122 that extends away from the outer side of the support beams 114.

In the illustrated non-limiting example, the rear load wheel assembly 108 may be in the form of a wheeled cart that includes a first load wheel 124, a second load wheel 126, a coupling plate 128, and a rear cover 130. The first load wheel 124 and the second load wheel 126 may be rotatably coupled to laterally-opposing sides of the rear load wheel assembly 108. The coupling plate 128 may be arranged on a rear side 132 of the rear load wheel assembly 108 (e.g., a side facing away from the operator compartment 106) and extend vertically upward therefrom. In the illustrated non-limiting example, the coupling plate 128 includes a pair of slots 134 formed thereon to facilitate the coupling of a hitch to the rear load wheel assembly 108. The hitch may allow towed equipment (e.g., a cart or wagon) to be selectively coupled to the rear load wheel assembly 108, and thereby to the material handling vehicle 100. In other non-limiting examples, the coupling plate 128 may include another structure form therein or attached thereto to facilitate that attachment of a hitch and/or towed equipment.

In the illustrated non-limiting example, the rear load wheel assembly 108 may be coupled to the back end 118 of the vehicle frame 102 via an articulating axle assembly 136. The articulating axle assembly 136 includes a pivot shaft 138, one or more bearings 140, one or more locking collars 142, a washer 144, and one or more fastening elements 146. In the illustrated non-limiting example, the articulating axle assembly 136 includes a first bearing 148 and a second bearing 150 in the form of pillow block bearings, and a corresponding first locking collar 152 and a second locking collar 154. In other non-limiting examples, the articulating axle assembly 136 may include more or less than two bearings 140 and a corresponding number of locking collars 142.

The pivot shaft 138 can extend longitudinally away from the back end 118 of the vehicle frame 102. In the illustrated non-limiting example, the pivot shaft 138 extends beyond terminal ends 115 of the support beams 114. The pivot shaft 138 may be attached to the vehicle frame 102 by a pair of axle mounting plates 156, including a first axle mounting plate 156a and a second axle mounting plate 156b, that extend between the support beams 114. In the illustrated non-limiting example, the first and second axle mounting plates 156a, 156b are arranged perpendicular to the pivot shaft. The axle mounting plates 156 may be rigidly attached to the support beams 114 at the back end 118 of the vehicle frame 102 and may extend or span between a gap formed laterally between the support beams 114. Each of the axle mounting plates 156 includes a shaft aperture 158 that receives the pivot shaft 138. In some non-limiting examples, the pivot shaft 138 may be rigidly attached to the axle mounting plates 156, such that the pivot shaft 138 may be prevented from displacing axially relative to the axle mounting plates 156. In the illustrated non-limiting example, the pivot shaft 138 is rigidly engaged with each of the first and second axle mounting plates 156a, 156b such that the pivot shaft is rotationally locked to the first and second axle mounting plates 156a, 156b, and thereby the vehicle frame 102.

When assembled, the pivot shaft 138 may be inserted through the bearings 140 and the locking collars 142, and the bearings 140 may be attached to a bottom surface 160 of the rear load wheel assembly 108 (see, e.g., FIG. 3) via the fastening elements 146. For example, to assemble the rear load wheel assembly 108 to the vehicle frame 102, the first bearing 148 may be inserted onto the pivot shaft 138 to an axial location along the pivot shaft 138 that is adjacent to the axle mounting plates 156. Once the first bearing 148 is arranged in a desired axial location along the pivot shaft 138, the first bearing 148 may be fastened to the bottom surface 160 of the rear load wheel assembly 108 using the fastening elements 146. In some non-limiting examples, the one or more fastening elements 146 may be in the form of a bolt or a screw. Once the first bearing 148 is attached to the bottom surface 160, the first locking collar 152 may be inserted onto the pivot shaft 138 until it engages with the first bearing 148. The first locking collar 152 may then be fastened to the pivot shaft 138 to axially secure the first bearing 148 on the pivot shaft 138.

With the first bearing 148 and the first locking collar 152 installed on the pivot shaft 138, the second locking collar 154 may be inserted onto the pivot shaft 138 to a desired axial location that is axially separated from the first locking collar 152. The second bearing 150 may then be inserted onto the pivot shaft 138 until it engages the second locking collar 154. The second bearing 150 may then be fastened to the bottom surface 160 via the fastening elements 146, and the washer 144 may be attached to a distal end of the pivot shaft 138 via a washer fastening element 147.

In general, the articulating axle assembly 136 may prevent axial displacement (e.g., movement along the center axis of the pivot shaft 138) between the rear load wheel assembly 108 and the vehicle frame 102, while allowing the rear load wheel assembly 108 to pivot rotationally (e.g., circumferentially about the pivot shaft 138) in a first direction (e.g., in a clockwise direction from a front perspective of the material handling vehicle 100) and a second direction (e.g., in a counter-clockwise direction from a front perspective of the material handling vehicle 100) relative to a longitudinal axis 155 of the vehicle frame 102. For example, the first locking collar 152 and the washer 144 in conjunction with the washer fastening element 147 (see FIG. 2) may prevent axial movement of the rear load wheel assembly 108 along the pivot shaft 138 in a first direction (e.g., to the left from the perspective of FIG. 3), and the second locking collar 154 may prevent axial movement of the rear load wheel assembly 108 along the pivot shaft 138 in a second direction (e.g., to the right from the perspective of FIG. 3). While the first bearing 148 and the second bearing 150 may be prevented from displacing axially along the pivot shaft 138, the first bearing 148 and the second bearing 150 may provide a rotational coupling between rear load wheel assembly 108 and the pivot shaft 138, and thereby the vehicle frame 102. In this way, for example, the rear load wheel assembly 108 may be allowed to pivot rotationally (e.g., in a first or second direction indicated by arrow 162 of FIG. 2) relative to the vehicle frame 102.

With specific reference to FIGS. 2 and 3, in the illustrated non-limiting example, a portion of the rear load wheel assembly 108 can extend over a portion of the vehicle frame 102 such that the bottom surface 160 of the rear load wheel assembly 108 can engage with, or come in contact with, portions of the vehicle frame 102. For example, the pair of support beams 114 (including a first support beam 114a and a second support beam 114b) can define rotational stops that can mechanically limit the amount or articulation or rotation between the rear load wheel assembly 108 and the vehicle frame 102. As illustrated in FIG. 2, the support beams 114 can define a substantially rectangular cross-section forming planar upper surface. The upper surfaces of the support beams 114, and in some cases, outer or corner portions of the support beams 114, can engage with the bottom surface 160 of the rear load wheel assembly 108. For example, when the rear load wheel assembly 108 pivots in a first direction, the bottom surface 160 of the rear load wheel assembly 108 (see FIG. 3) can come into contact with a portion of the first support beam 114a, thereby defining a first rotational stop. Similarly, when the rear load wheel assembly 108 pivots in a second direction, the bottom surface 160 of the rear load wheel assembly 108 can come into contact with a portion of the second support beam 114b, thereby defining a second rotational stop.

With specific reference to FIG. 3, in the illustrated non-limiting example, the material handling vehicle 100 includes a drive wheel 164 and an offset wheel 166, which is laterally offset from the drive wheel 164 (e.g., with respect to the longitudinal axis 155), arranged under and coupled to the vehicle frame 102 (e.g., under the power section 104). The drive wheel 164 may be coupled to a motor and may be used to control a direction and speed of the material handling vehicle 100 during travel. In the illustrated non-limiting example, the first load wheel 124, the second load wheel 126, the drive wheel 164, and the offset wheel 166 define four-points of contact (i.e., a four-point stance) for the material handling vehicle 100.

General operation of the material handling vehicle 100 will be described with reference to FIGS. 1-3. Typically, a wagon or cart may be coupled to the material handling vehicle 100 via the coupling plate 128, and an operator arranged within the operator compartment 106 may manipulate the vehicle controls 112 to control a speed and direction provided by the drive wheel 164. The operator may travel to a desired location, for example, within a warehouse, stop the material handling vehicle 100 and pick a product from a shelf or rack. The picked product may be placed in the cart or wagon, and the operator may travel to the next picking location. In the event that the product is located on a higher shelf or rack level, the operator may raise the operator compartment 106 by manipulating the vehicle controls 112, pick the product from the elevated location, lower the operator compartment 106, and then place the product in the cart or wagon.

As the material handling vehicle 100 travels throughout the environment, the articulating axle assembly 136 may allow the rear load wheel assembly 108 to pivot or rotate about the longitudinal axis 155 relative to the vehicle frame 102, for example, when the material handling vehicle 100 travels over uneven flooring. In this way, for example, the first load wheel 124 or the second load wheel 126 may pivot relative to the drive wheel 164 and the offset wheel 166, which are rigidly mounted under the vehicle frame 102. The pivoting of the first load wheel 124 and the second load wheel 126 may maintain the drive wheel 164 and the offset wheel 166 in contact with the floor on which the material handling vehicle 100 travels (e.g., the floor that the drive wheel 164 and the offset wheel 166 travel), even as the material handling vehicle 100 travels over uneven portions of the floor. The constant contact between the drive wheel 164 and the offset wheel 166 and the floor may allow the operator compartment 106 to be raised or lowered as the material handling vehicle 100 is traveling between pick locations, which improves picking efficiency for the operator. In addition, the ability of the operator compartment 106 to raise and lower provides improved ergonomics for the operator when picking products from elevated locations.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:
1. A material handling vehicle comprising:
 a vehicle frame including a drive wheel and an offset wheel arranged under the vehicle frame;

a pivot shaft rigidly coupled to and extending from the vehicle frame; and a rear load wheel assembly pivotally coupled to the vehicle frame via an articulating axle assembly, the rear load wheel assembly including a first load wheel and a second load wheel laterally opposite the first load wheel;

wherein the pivotal coupling between the rear load wheel assembly and the vehicle frame provided by the articulating axle assembly is configured to maintain both the drive wheel and the offset wheel in contact with a floor on which the drive wheel and the offset wheel travel; and wherein the rear load wheel assembly extends over a portion of the vehicle frame.

2. The material handling vehicle of claim 1, wherein the articulating axle assembly includes a bearing and a locking collar.

3. The material handling vehicle of claim 2, wherein the pivot shaft extends longitudinally from a rear of the vehicle frame.

4. The material handling vehicle of claim 3, wherein the pivot shaft protrudes beyond a terminal end of the vehicle frame.

5. The material handling vehicle of claim 3, wherein the pivot shaft is received within the bearing and the locking collar, and wherein the bearing is fastened to the rear load wheel assembly.

6. The material handling vehicle of claim 5, wherein the bearing provides a rotational coupling between the pivot shaft and the rear load wheel assembly.

7. The material handling vehicle of claim 1, wherein the vehicle frame includes a first support beam and a second support beam extending longitudinally along the material handling vehicle and separated by a gap, wherein the first support beam defines a first rotational stop for the rear load wheel assembly and the second support beam defines a second rotational stop for the rear load wheel assembly.

8. The material handling vehicle of claim 7, wherein the vehicle frame further includes a first axle mounting plate and a second axle mounting plate, wherein the first and second axle mounting plates span between the first and second support beams, wherein the pivot shaft is arranged between the first and second support beams, and wherein the first and second axle mounting plates are rigidly coupled to both the pivot shaft and the first and second support beams.

9. The material handling vehicle of claim 1, wherein the articulating axle assembly includes a pair of bearings and a pair of locking collars and the pivot shaft extends through the pair of bearings and the pair of locking collars, wherein the pair of bearings are axially separated on the pivot shaft, and wherein the pair of locking collars prevent the rear load wheel assembly from displacing axially relative to the vehicle frame, and wherein the pair of bearings provide a rotational coupling between the rear load wheel assembly and the vehicle frame.

10. The material handling vehicle of claim 1, wherein the vehicle frame includes an operator compartment that is selectively moveable vertically relative to the floor.

11. A material handling vehicle comprising:

a vehicle frame including a drive wheel and an operator compartment, wherein the operator compartment is selectively movable vertically relative to a floor on which the drive wheel travels; and a rear load wheel assembly pivotally coupled to the vehicle frame via an articulating axle assembly, wherein the rear load wheel assembly includes a first load wheel and a second load wheel, and wherein the first load wheel and the second load wheel are configured to pivot relative to the vehicle frame to maintain the drive wheel in contact with the floor;

wherein the rear load wheel assembly extends over a portion of the vehicle frame.

12. The material handling vehicle of claim 11, wherein the articulating axle assembly includes a pivot shaft rigidly coupled to the vehicle frame, a bearing, and a locking collar.

13. The material handling vehicle of claim 12, wherein the pivot shaft extends longitudinally beyond a terminal end of the vehicle frame.

14. The material handling vehicle of claim 13, wherein the pivot shaft is received within the bearing and the locking collar, and wherein the bearing is fastened to the rear load wheel assembly.

15. The material handling vehicle of claim 14, wherein the bearing provides a rotational coupling between the pivot shaft and the rear load wheel assembly.

16. The material handling vehicle of claim 12, wherein the vehicle frame includes a first support beam and a second support beam extending longitudinally along the material handling vehicle and separated by a gap, wherein the first support beam defines a first rotational stop for the rear load wheel assembly and the second support beam defines a second rotational stop for the rear load wheel assembly.

17. The material handling vehicle of claim 16, wherein the vehicle frame further includes a first axle mounting plate and a second axle mounting plate, wherein the first and second axle mounting plates span between the first and second support beams, wherein the pivot shaft is arranged between the first and second support beams, and wherein the first and second axle mounting plates are rigidly coupled to both the pivot shaft and the first and second support beams.

18. The material handling vehicle of claim 16, wherein the articulating axle assembly includes a pivot shaft, a pair of bearings, and a pair of locking collars and the pivot shaft extends through the pair of bearings and the pair of locking collars, wherein the pair of bearings are axially separated on the pivot shaft, and wherein the pair of locking collars prevent the rear load wheel assembly from displacing axially relative to the vehicle frame, and wherein the pair of bearings provide a rotational coupling between the rear load wheel assembly and the vehicle frame.

* * * * *